Nov. 7, 1933.                H. C. ROTH                1,934,448
                               BRAKE
                         Filed March 31, 1932
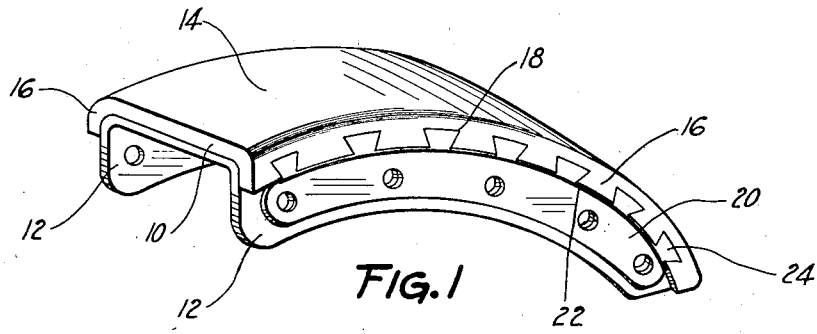
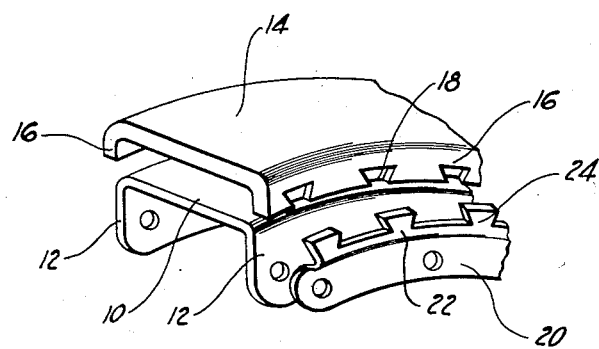
INVENTOR.
HARRIS C. ROTH
BY
   ATTORNEY Patented Nov. 7, 1933

1,934,448

UNITED STATES PATENT OFFICE 1,934,448

BRAKE

Harris C. Roth, South Bend, Ind., assignor to Bendix Aviation Corporation, South Bend, Ind., a corporation of Delaware Application March 31, 1932. Serial No. 602,302

3 Claims. (Cl. 188—234)

This invention relates to brakes and more particularly to lining for the friction elements of brakes.

Heretofore various means have been employed for securing linings to friction elements. Generally linings are secured to friction elements by rivets passing through the linings and the elements. In some instances rivets have their heads countersunk or embedded in the lining material, and their shanks extending through suitable openings in the friction elements. In other instances lining material is cast on a flexible backing having suitable means for securing the lining to the friction element.

Several of these manufacturing methods have proved reasonably satisfactory. However, in all known methods of fastening linings to friction elements, the fastening members either pass directly through the lining or have a portion imbeded in the material; hence, the fastening members, due to wear imposed on the lining, evidently engage the associated braking surface, causing injury thereto. The present invention aims to overcome this objection.

In the illustrated embodiment of the invention, a friction element of a well known type has secured thereto a molded lining. The lining is cast with parallel flanges provided with spaced dovetail pockets. The flanges embrace the friction element and the lining is secured against displacement by plates riveted or otherwise secured to the elements having spaced dovetail portions fitted snugly in the pockets in the flanges on the lining.

An object of the invention is to provide means for securing a lining to a friction element without disturbing the face of the lining.

Another object of the invention is to provide means for securing a lining to a friction element including means for clamping the edges of the lining to the friction element.

Another object of the invention is to provide means for securing a lining to a friction element including members interlocked with the edges of the lining.

A feature of the invention is a molded lining for a friction element having parallel flanges provided with pockets and plates secured on the friction element having portions fitted snugly in the pockets.

Other objects and features of the invention will appear from the following description taken in connection with the drawing, which forms a part of this specification, and in which:

Figure 1 is a perspective view of a friction element embodying the invention; and Figure 2 is an exploded perspective view illustrating a friction element and the lining therefor.

Referring to the drawing for more specific details of the invention, 10 represents a friction element or a brake shoe having its edges turned to provide parallel flanges 12, and the face of the friction element or shoe is covered by lining 14 preferably of the molded type.

As shown, the lining has parallel flanges 16 arranged to embrace the flanges on the friction element or shoe. The flanges on the lining are provided with spaced dovetail pockets 18. Plates 20 suitably secured on the flanges on the friction element or shoe are offset as indicated at 22 and provided with spaced dovetail portions 24 fitted snugly in the pockets 18. This interlocking connection between the lining and the plates effectively retains the lining against endwise movement and other displacement.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent, is:

1. In combination, a friction element and a lining therefor comprising a member having its edges turned to embrace the element and pockets arranged in the edges thereof, and members secured to the element having portions fitted into the pockets.

2. In combination, a friction element and a lining therefor comprising a member having its edges turned to embrace the element, and having dovetail pockets arranged on its edges in spaced relation, and members secured to the element having dovetail portions fitting snugly in the pockets.

3. In combination, a friction element and a lining therefor having parallel flanges comprising molded lining having parallel flanges embracing the flanges on the element and having dovetail pockets arranged in spaced relation in its flanges, and plates secured to the flanges on the element having dovetail portions fitted into the dovetail pockets.

HARRIS C. ROTH.